United States Patent [19]
DiCarlo et al.

[11] Patent Number: 5,416,908
[45] Date of Patent: May 16, 1995

[54] INTERFACE BETWEEN INDUSTRIAL CONTROLLER COMPONENTS USING COMMON MEMORY

[75] Inventors: David A. DiCarlo, Windsor; William E. Floro, Willoughby; Mike Keith, Willowick, all of Ohio; John J. Baier, Saline, Mich.; Jeffrey H. Campau, Pinckney, Mich.; Daniel P. Noonen, Saline, Mich.; Stuart B. Siegel, Clinton, Mich.

[73] Assignee: Allen-Bradley Company, Inc., Milwaukee, Wis.

[21] Appl. No.: 875,173

[22] Filed: Apr. 28, 1992

[51] Int. Cl.⁶ .............................................. G06F 13/14
[52] U.S. Cl. ................................... 395/275; 395/200
[58] Field of Search .............. 395/275, 325, 425, 700, 395/200; 371/20.1, 20.4, 21.2

[56] References Cited
U.S. PATENT DOCUMENTS

| | | | |
|---|---|---|---|
| 4,413,319 | 11/1983 | Schultz et al. | 395/275 |
| 4,521,871 | 6/1985 | Galdun et al. | 395/275 |
| 4,571,676 | 2/1986 | Mantellina et al. | 395/425 |
| 4,633,392 | 12/1986 | Vincent et al. | 395/325 |
| 4,688,172 | 8/1987 | Wright | 395/700 |
| 4,691,296 | 9/1987 | Struger | 395/275 |
| 4,718,003 | 1/1988 | Andersen et al. | 395/200 |
| 4,751,636 | 6/1988 | Sibley | 395/425 |
| 4,764,868 | 8/1988 | Ketelhut et al. | 395/275 |
| 4,809,217 | 2/1989 | Floro et al. | 395/275 |
| 5,077,684 | 12/1991 | Kitajima | 395/275 |
| 5,093,804 | 3/1992 | Cien et al. | 395/275 |
| 5,117,393 | 5/1992 | Miyazawa et al. | 365/201 |
| 5,204,669 | 4/1993 | Dorfe et al. | 340/825.52 |
| 5,216,771 | 5/1993 | Clara et al. | 395/500 |
| 5,225,974 | 7/1993 | Matthews et al. | 364/140 |
| 5,257,388 | 10/1993 | Hayamizu | 395/800 |
| 5,265,005 | 11/1993 | Schmidt et al. | 364/147 |
| 5,274,767 | 12/1993 | Maskovyak | 395/275 |

Primary Examiner—Parshotam Lall
Assistant Examiner—Viet Vu
Attorney, Agent, or Firm—Quarles & Brady

[57] ABSTRACT

Data is exchanged between two modules of a programmable controller by originator module writing the information in an interface memory in one of the modules and the recipient module reading the information from the memory. An initialization procedure is performed before any information is exchanged in that manner. The module containing the memory writes the size of the memory for reading by the other module. Sets of test data are stored in the memory by each module and checked by the other module to determine if data can be passed accurately between the modules in both directions. Then data identifying the type of one of the modules is exchanged to insure that the other module knows the type of module with which it is dealing.

8 Claims, 8 Drawing Sheets

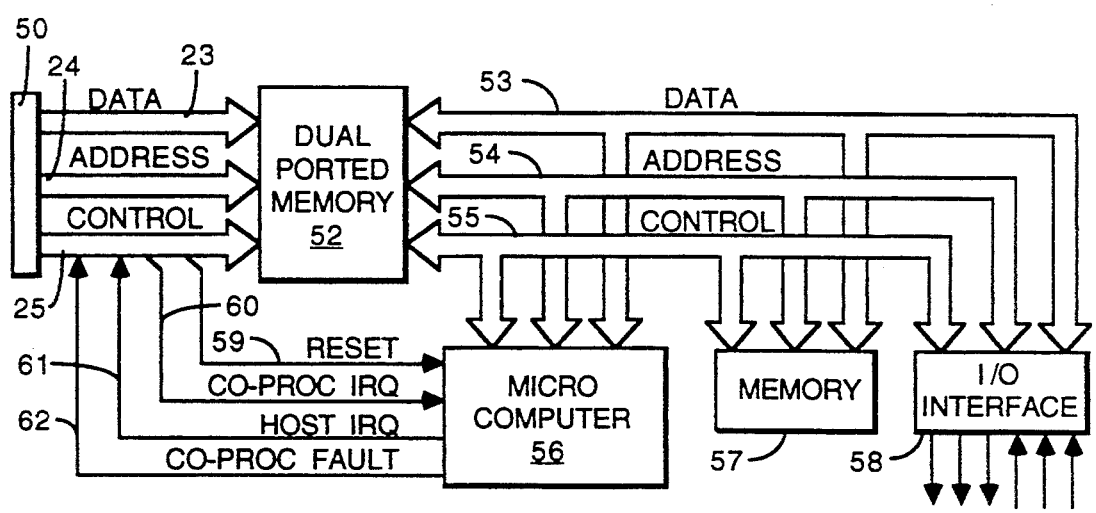
FIG. 3      CO-PROCESSOR MODULE 17
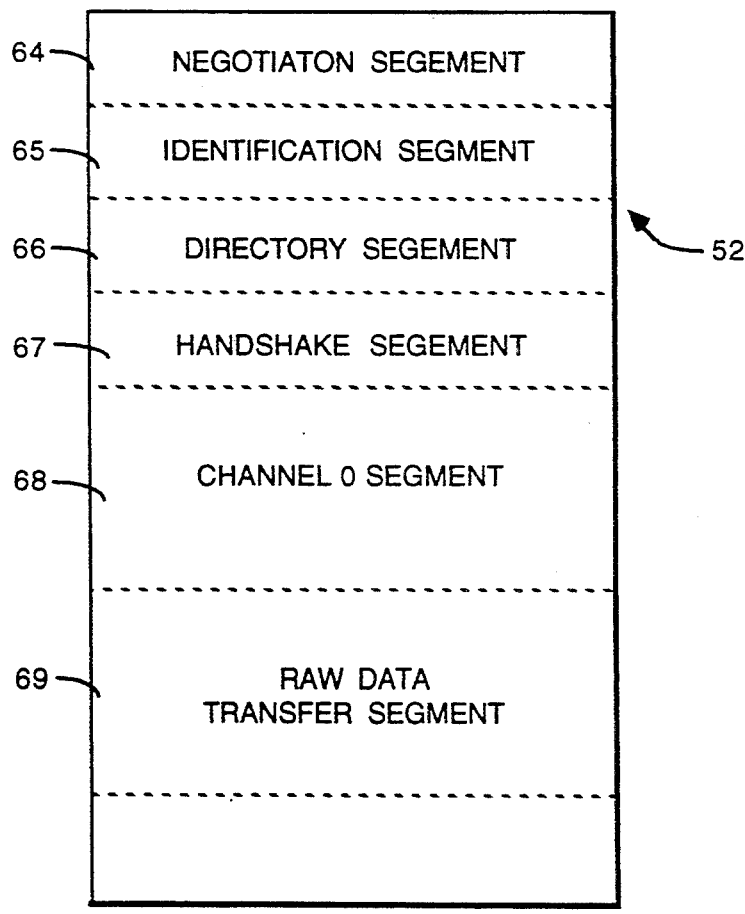
FIG. 4

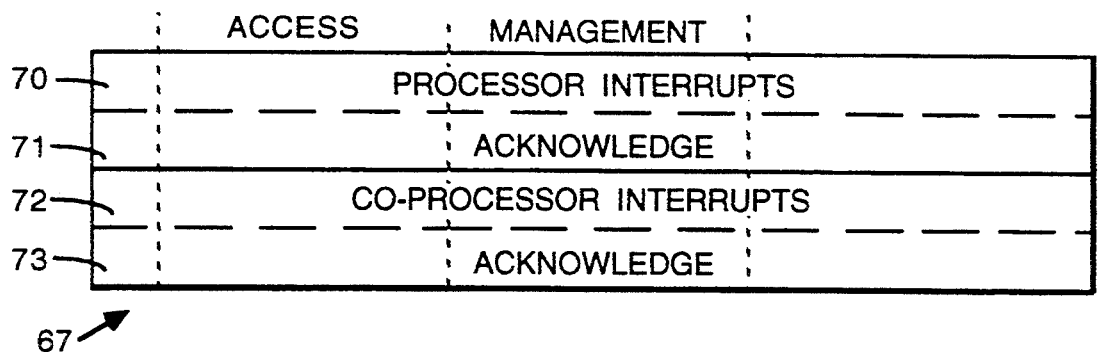
FIG. 5  HANDSHAKE SEGMENT
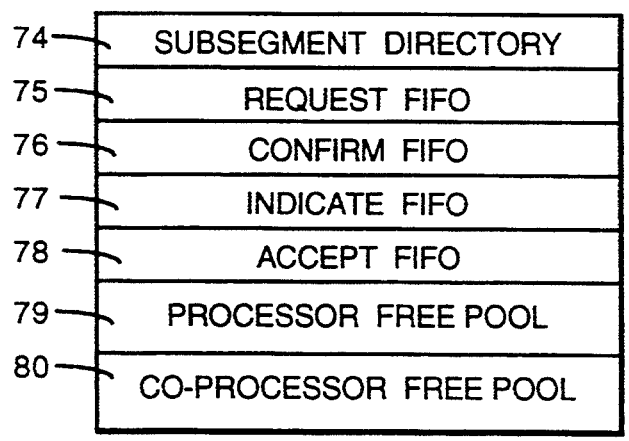
FIG. 6
CHANNEL 0
SEGMENT

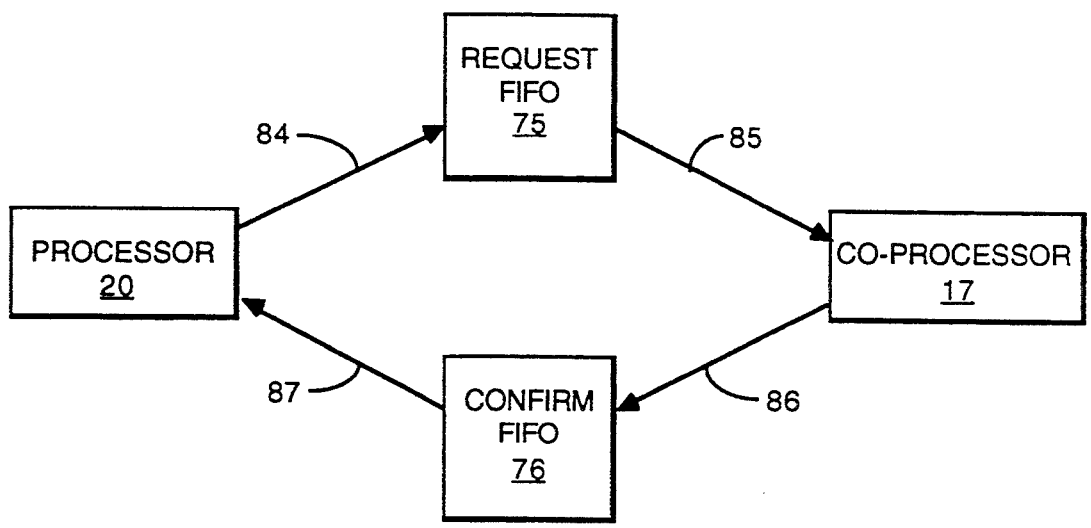
FIG. 7
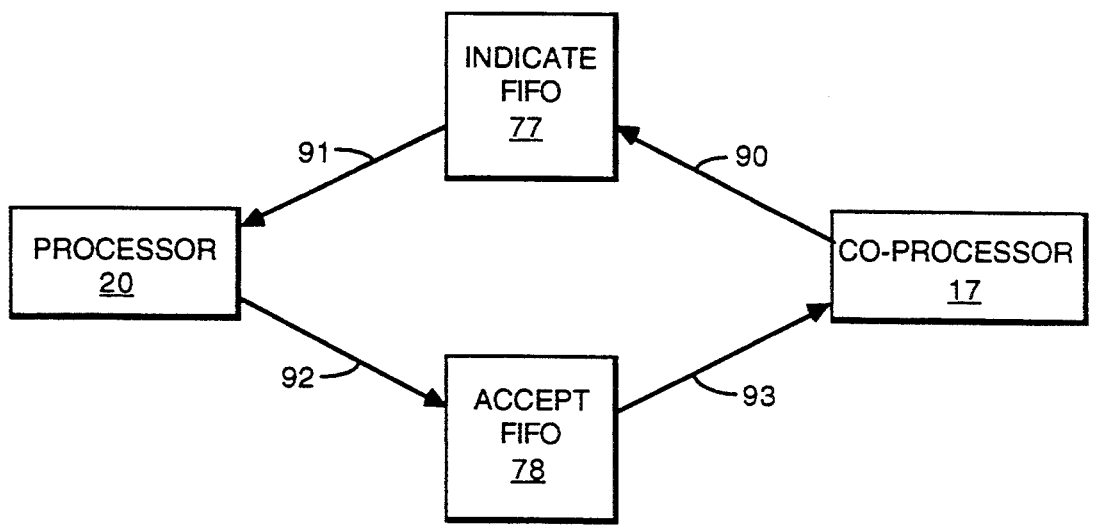
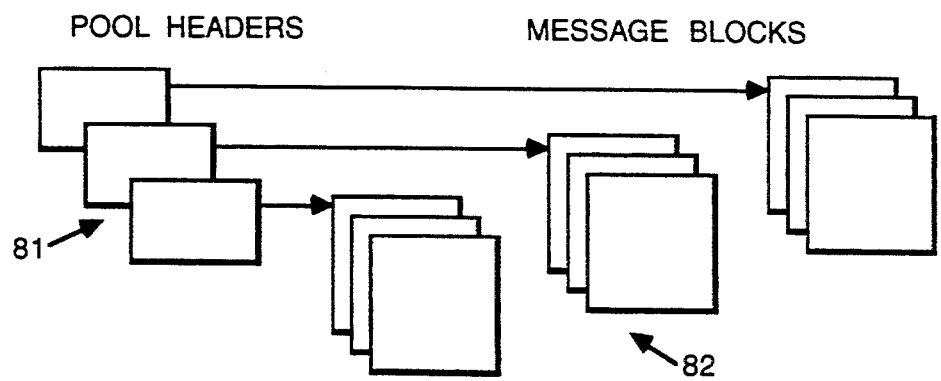

CO-PROCESSOR CONNECTION PROCEDURE

CO-PROCESSOR DISCONNECTION PROCEDURE

INTERFACE BETWEEN INDUSTRIAL CONTROLLER COMPONENTS USING COMMON MEMORY

The present invention relates to programable controllers that govern the operation of industrial equipment, and more specifically to modularized programmable controllers and the interface between a main processor module and a special function co-processor module.

BACKGROUND OF THE INVENTION

Programmable controllers are a well known class of industrial computers for operating a wide variety of manufacturing equipment, such as assembly lines and machine tools, in accordance with a stored control program. The program comprises a series of process control instructions which are read out and executed to examine the condition of selected sensing devices on the controlled equipment, and to energize or deenergize selected operating devices contingent upon the status of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. As used herein the term "byte" refers to eight-bits of digital data, and the term "word" refers to sixteen-bits, or two bytes, of data. Additional program instructions perform arithmetic operations, timing and counting functions, and complex statistical reporting operations. These instructions have become quite standardized in the industry and are directly associated with the elements of a ladder logic diagram which is easily understood by process control engineers.

As programmable controllers were applied to more complex manufacturing systems, they were required to perform a wider range of tasks quickly. In order to perform certain tasks quickly and efficiently, custom co-processor circuits have been proposed to relieve the primary processing unit of the programmable controller from handling those tasks. However, the operation of the co-processor has to be coordinated with that of the primary processing unit. In addition, as different custom co-processors can be connected to the same programmable controller, a mechanism is required by which the functionality of the co-processor can be identified by the primary processing unit.

SUMMARY OF THE INVENTION

A programmable controller has a processor module that executes a stored control program to operation a machine. A functional module, such as a co-processor module, is connected to the processor module. Data messages are exchanged between the modules by the originating module writing the information in an interface memory in one of the modules and the recipient module reading the information from the memory.

Before data can be exchanged reliably between the modules in this manner an initialization process is performed to determine whether the data interface between the two modules is operating satisfactorily. At the beginning of the process the module containing the memory writes data into the memory which specifies a number of storage locations in the memory. The other module reads the size data from the memory and stores the size data for subsequent use in exchanging information through the memory.

Next the processor module writes a first predefined set of test data into a set of storage locations of the memory. Then the functional module reads data from the set of storage locations and determines whether the data that was read matches the first predefined set of data. If a match does not exist an error indication is sent to the processor module which responds by setting a indication that the problems exist with the exchange of data between the modules. Otherwise when the data matches, the functional module writes a second predefined set of data into a group of storage locations of the memory. The processor module responds to that action of the functional module by reading data from the group of storage locations of the memory and determining whether the data matches the second predefined set of data. When the data does not match, the processor module sets a indication that the problems exist with the exchange of data between the modules.

If data is exchanged satisfactorily in both directions between modules, the processor module writes into a prescribed storage location of the memory either an identification of a functional module type, or default information if the processor module does not possess an identification of a functional module type. The functional module reads data from the prescribed storage location of the memory and determines whether the data correctly identifies the functional module. When the data does not properly identify a functional module, the functional module writes data designating its actual type into the prescribed storage location of the memory. The processor module reading data from the prescribed storage location of the memory.

An object of the present invention is to provide an apparatus and method for initializing an interface through which data is exchanged between two modules of a programmable controller. This insures that the interface is functioning properly before an attempt to send real data through the interface.

Another object is to provide a mechanism by which both modules independently test the interface by storing data in the memory of the interface and reading the data back from the memory.

A further object is to provide a technique by which each module send known test data to the other module and the other modules verifies that the known test data was properly received.

Still another object of the present invention is to send data defining the functionality of the interface and the functional module to the processor module in order to enable the processor module to exchange data with the functional module.

BRIEF DESCRIPTION OF THE DRAWINGS

FIG. 3 is a functional block diagram of one type of a co-processor module that is connected to the processor module;

FIG. 4 is a map of a dual-ported random access memory in the co-processor module;

FIG. 5 is a map of the handshake segment which forms part of the memory map of FIG. 4;

FIG. 6 is a map of the channel 0 segment of the memory map of FIG. 4;

FIG. 7 is a diagram of the data structures stored in the dual-ported memory;

DETAILED DESCRIPTION OF THE INVENTION

Figure 1:
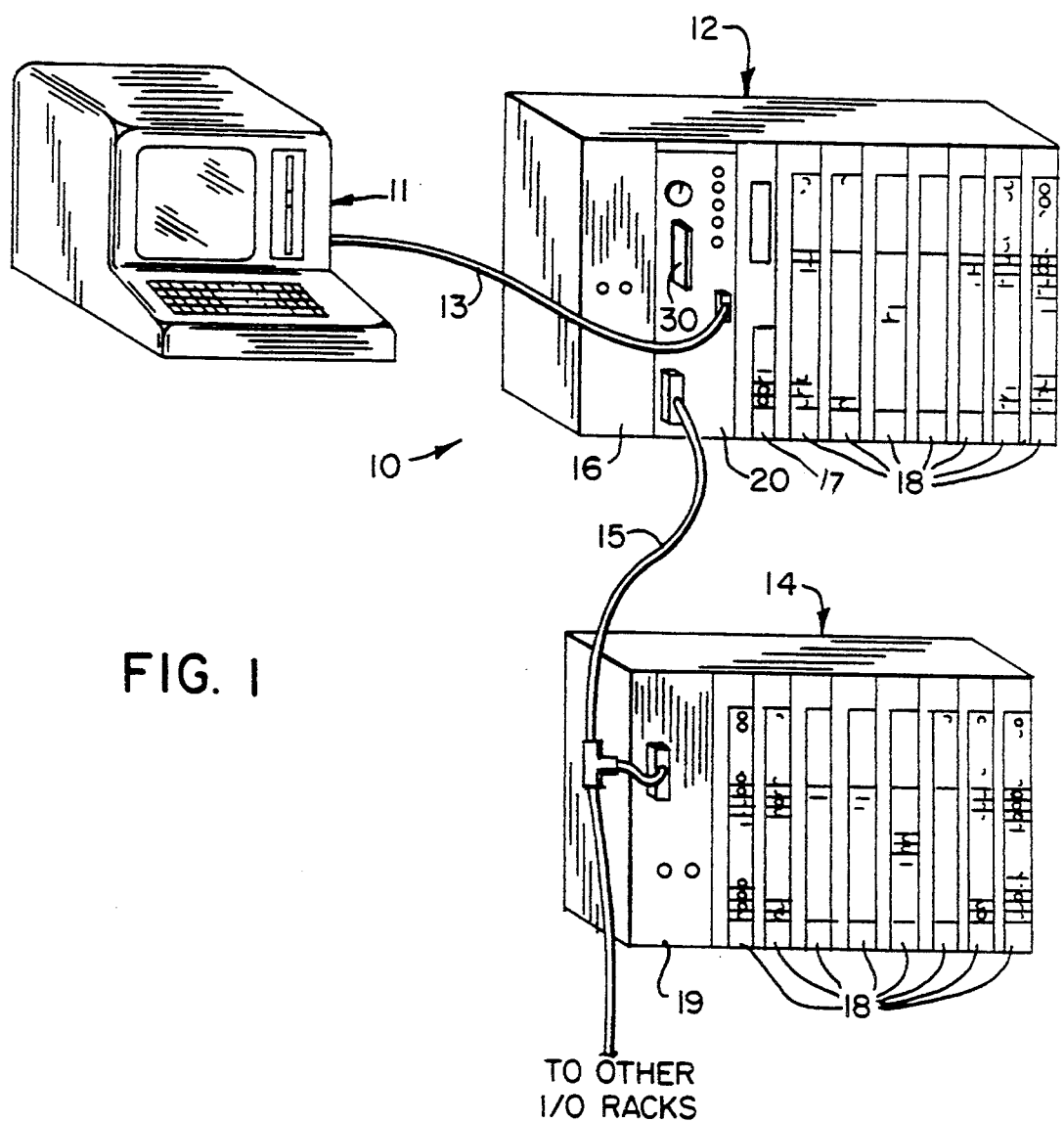
FIG. 1 is a pictorial representation of a programmable controller system which employs the present invention.

Referring to FIG. 1, a programmable controller system generally designated as 10 comprises a primary equipment rack 12 and a series of remote input/output (I/O) racks, such as rack 14, connected by a serial I/O network 15. A terminal 11 enables the user to program the controller 10 and monitor its operation.

The primary rack 12 houses a power supply 16, processor module 20, a co-processor module 17 and a plurality of input/output (I/O) interface modules 18. The processor module 20 and the co-processor module 17 also are referred to herein simply as the processor and co-processor, respectively. The processor module 20 executes a user-defined control program that responds to signals from sensing devices on the controlled equipment by issuing signals to actuating devices on the same equipment. The sensing and actuating signals are coupled to the rack 12 through the input/output interface modules 18. The various modules 18 and 20 within the primary rack 12 are electrically interconnected by conductors on a backplane of the rack enabling data and control signals to be exchanged among the modules.

The processor module 20 receives programing instructions via the terminal 11 that is connected by cable 13 to a serial port connector on the front panel of the module. The serial I/O network 15 is coupled to a second connector on the front panel of the processor module 20 and to an adaptor module 19 in the remote I/O rack 14, enabling the processor module 20 to exchange data with another group of I/O modules 18 within the remote I/O rack. Alternatively, a local area network can be coupled to one of the connectors on the front panel of the processor module 20 enabling communication with a host computer and other programmable controllers coupled to that network.

The co-processor module 17 processes data received from the processor module 20 and sends the results back to the processor module. Although the I/O modules 18 and the adaptor module 19 are conventional devices, the processor and co-processor modules 20 and 17 are unique to the present invention. As a result, these latter two modules will be described in detail.

A. Processor Module

Figure 2:
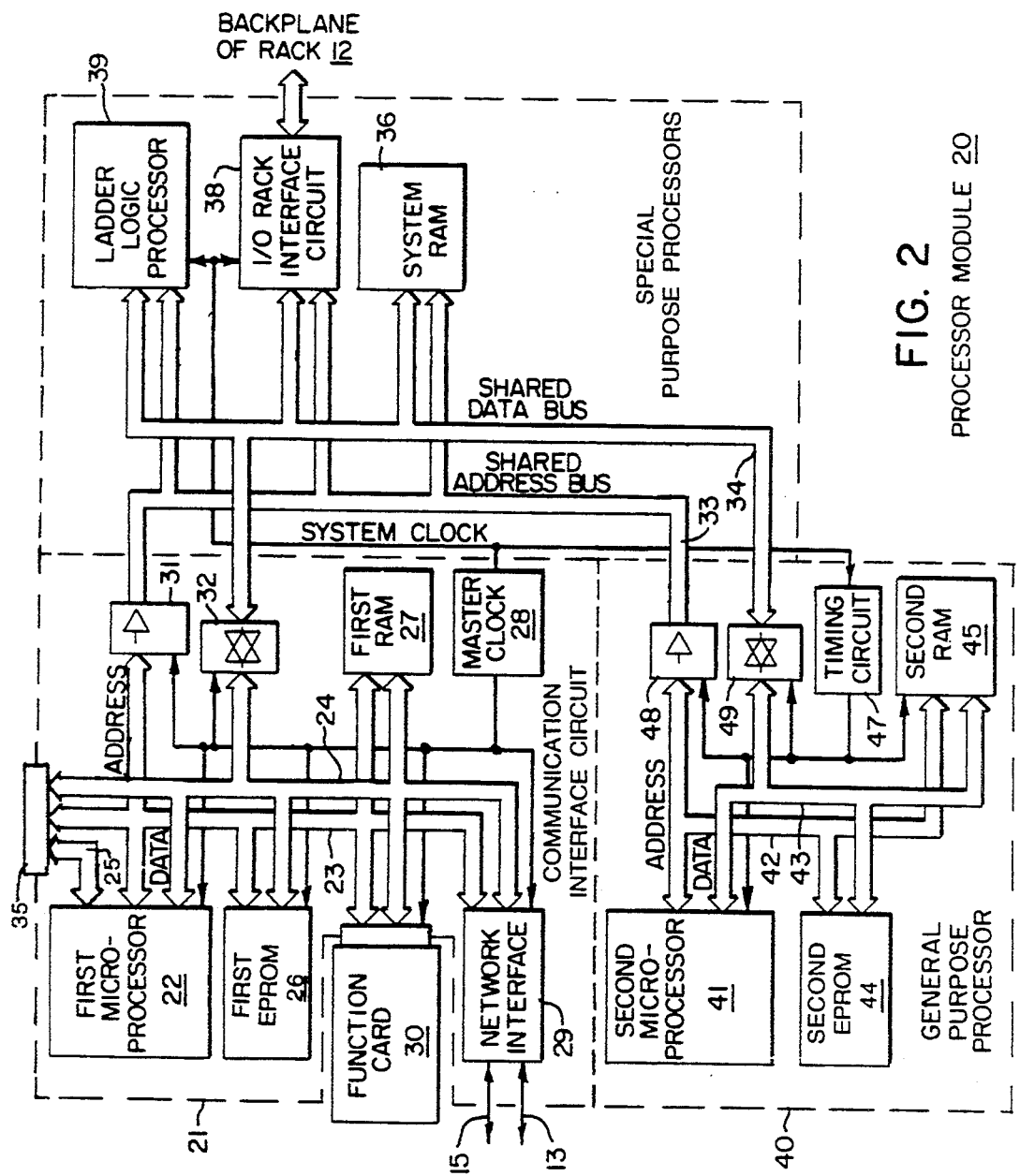
FIG. 2 is a functional block diagram of a processor module which forms part of the controller of FIG. 1.

With reference to FIG. 2, the processor module 20 includes a general purpose processor section 40 for user control program execution and a communication interface circuit 21 which handles the exchange of data over cable 13 and the serial I/O network 15. The processor module 20 also has a set of shared buses which connect these sections 21 and 40 with system memory 36 and dedicated processing circuits 38 and 39.

The communication interface circuit 21 is formed around a local address bus 23 and a local sixteen-bit wide data bus 24. Coupled to these buses is a first microprocessor 22 which may be a model 68000 manufactured by Motorola Inc. The first microprocessor 22 executes a program stored in an electrically programmable read only memory (EPROM) 26 and utilizes a random access memory (RAM) 27 for data storage. A master clock circuit 28 provides a system clock signal to the other components of the processor module 20 as well as providing specific miming signals to the components of the communication interface circuit 21.

A major function assigned to the first microprocessor 22 is the control of communication with the programing terminal 11 and the serial I/O network 15. A communication network interface circuit 29 couples the local address and data buses 23 and 24 to the terminal cable 13 and to the remote I/O cable 15. The communication network interface circuit 29 translates the data between a parallel format used within the processor module and a serial format used to exchange data over terminal cable 13 and serial I/O network 15.

A small removable printed circuit card 30 extends through a opening in the front panel of the processor module 20 (as shown in FIG. 1) and has a connector that engages the local buses 23 and 24. The card 30 can take several forms one of which contains memory in which machine control programs are archived.

The local buses 23 and 24 of the communication interface circuit 21 and a set of control lines 25 from the first microprocessor 22 are coupled to a connector 35 on the side of the processor module 20. The co-processor module 17 attaches to the connector 35 as a means by which the two modules electrically interface with each other. This interface and the co-processor module 17 will be described in detail.

The communication interface circuit 21 is coupled to other processor module components through a set of tri-state address gates 31 and a set of bidirectional tri-state data gates 32. Specifically, the set of gates 31 couples the local address bus 23 to the module's shared address bus 33, and the set of data gates 32 couples the local data bus 24 to a sixteen-bit wide shared data bus 34. Other lines carrying conventional control signals extend between components of the processor module 20, but have not been shown in order to simplify the illustration.

This connection of buses allows the first microprocessor 22 to write and read data to and from a shared system RAM 36 connected to the shared address and data buses 33 and 34. This system RAM 36 holds a conventional set of input/output data tables storing the status of sensing and operating devices on the machine controlled by the programmable controller. The user-defined control program is stored in another section of the shared system RAM 36. A further section of the shared system RAM 36 is used to contain system, processor module, and microprocessor level configuration data.

Referring still to the processor module circuit in FIG. 2, an I/O rack interface circuit 38 is connected to the shared address and data buses and to the backplane of primary rack 12. This interface circuit 38 periodically scans the I/O modules 18 in the primary rack to gather input data from the sensors and send output data to the actuating devices. The scanning is accomplished in a manner similar to that employed by previous processor modules by sequentially sending control signals to each I/O module 18. These control signals cause input type modules to send sensor data over the backplane and cause output type modules to store data sent by the processor module 20. The data exchanged with the I/O modules 18 in the primary rack 12 are stored in the I/O data tables of the shared system RAM 36.

A ladder logic processor 39 also is coupled to the shared address and data buses 33 and 34. The vast majority of ladder control program instructions operate on a single bit or word of data. The ladder logic processor 39 has been designed to execute the subset of ladder diagram program instructions which perform these basic control operations. This not only provides efficient execution of these instructions, it also frees the microprocessors 22 and 41 in the module 20 to carry out other functions simultaneously with the control program execution.

Certain functions, such as immediate I/O module access, data block transfers to the I/O modules 18, and complex mathematical and logical operations cannot be performed by the ladder logic processor 39. These complex control program functions are executed in the general purpose processor section 40. Section 40 of the processor module 10 contains a second microprocessor 41 connected to its own isolated local address and data buses 42 and 43, respectively. This pair of local buses 42 and 43 couples the second microprocessor 41 to a second EPROM 44 and a second random access memory 45. The EPROM 44 stores the firmware which is executed by the second microprocessor 41 to carry out the complex ladder logic operations.

A timing circuit 47 receives the system clock signal and derives therefrom the necessary timing and control signals for the second microprocessor 41 and memories 44 and 45. A pair of tri-state transmission gates 48 and 49 isolate the local address and data buses 42 and 43 of the general purpose processor section 40 from the shared address and data buses 33 and 34. When these gates 48 and 49 are enabled in response to a command from the second microprocessor 41, the set of local buses 42 and 43 are electrically connected to shared buses 33 and 34. This enabling occurs only when the second microprocessor 41 has been granted access to the shared buses 33 and 34 by an arbitration circuit in the ladder logic processor 39.

B. Co-Processor Circuit

The processor module 20 couples directly to the co-processor module 17 via connector 35, rather than exchanging signals across the backplane of rack 12. Referring to FIG. 3, the co-processor module 17 has a connector 50 that mates with the connector 35 of the processor module 20. The data and address buses 23 and 24 and the control signal lines 25 from the processor module extend through these connectors 35 and 50 to one port of a dual-ported random access memory 52. The other port of the memory 52 is connected to a set of buses and control signal lines 53, 54 and 55 within the co-processor module 17. One skilled in the art will recognize that a shared memory can be substituted for the dual-ported memory 52 with the addition of mechanisms that arbitrate access to the memory and isolate the buses in each module except when the processor 20 is accessing the memory.

These buses and control signal lines 53-55 interconnect a microcomputer 56, memory 58 and an I/O interface 60. For example, the co-processor 17 may execute a control program that is written in another commuter language than the language which the processor module is able to execute or the co-processor can tabulate data from the I/O modules 18 to prepare reports summarizing the operation of the controlled machine. To perform these functions, the microcomputer 56 executes a program that is stored in the memory 57 which interprets the instruction of the other computer language or prepares the report. The co-processor 17 is connected to external I/O devices by the I/O interface circuit 58.

Data is exchanged between the processor and co-processor modules 20 and 17 by the originator storing the data in the dual ported memory 52 and interrupting the recipient module to indicate that data is waiting in the memory. The recipient module reads the dual ported memory 52 and processes the data.

Referring particularly to FIG. 4, the dual ported memory 52 stores data in segments. The first segment 64 is a negotiation segment which contains thirty-two bytes of data that is used at power-up to negotiate the characteristics of the communications between the processor and the co-processor. The negotiation segment gets its name from previous intelligent communication network interfaces in which the processor module and a communication circuit negotiate to determine parameters for exchanging data across a bus interface. For a co-processor interface, those parameters are well defined and negotiation is not required. However, the size of the dual-ported RAM 52 may vary with different types of co-processors and is stored in four bytes of the negotiation segment 64 for reading by the processor module 20.

Another word in the negotiation segment 64 portrays the current status of the processor module 20 after a cooperative reset procedure has been conducted by both modules 17 and 20. The processor module 20 changes the values of the bits of this word when its internal status flags change. Each bit represents a mode of processor module operation as defined by the following table:

TABLE I

| | | | |
|---|---|---|---|
| bit 0 - | RAM bad | bit 8 - | forces enabled |
| bit 1 - | run mode | bit 9 - | forces present |
| bit 2 - | test mode | bit 10 - | successful EEPROM burn |
| bit 3 - | program mode | bit 11 - | on line editing |
| bit 4 - | burning EEPROM | bit 12 - | debug mode |
| bit 5 - | download mode | bit 13 - | user program checksum finished |
| bit 6 - | edits enabled | bit 14 - | last scan of ladder or function chart step |
| bit 7 - | remote modes | bit 15 - | first scan of ladder or function chart step |

Although the basic implementation of the co-processor interface does not require negotiation of parameters for the data exchange, the present interface initialization process can be used with more complex modules which require such negotiation.

The second memory section is an identification segment 65 which contains information that indicates the series and revision number of the co-processor module.

The third memory section is a segment directory 66 that contains an array of segment descriptors that include the starting address of each segment in the dual ported memory 52, the size of each segment, the type of segment, and the instance of the segment. The segment directory 66 is an index to the other segments in the dual-ported memory 52. The types of segments include:
 0—negotiation segment 1—segment directory
2—identification segment
4—channel segment
5—inter-processor handshake flags
6—raw data transfer The instance indicates the number of their segment of a particular type.

Following the directory segment 66 is a handshake segment 67, which occupies eight bytes in the dual-ported RAM 52. As shown in FIG. 5, the handshake segment 67 includes two bytes 70 and 71 containing flag bits that relate to interrupts requests sent from the processor module 20 to the co-processor module 17 and two bytes 73 and 74 which store flags related to interrupt requests from the co-processor 17 to the processor module 20. More specifically, a flag bit is toggled in byte 70 by the processor module when it interrupts the co-processor module. The co-processor module 17 services the interrupt by reading these flags and determining which has been toggled. In each pair of bytes 70–71 and 72–73 function is represented by a pair of flag bits (one in each byte), one bit is controlled by the sender and the other by the receiver of a message. If the two bits are different then that flag in the handshake segment 67 is considered to be pending. Otherwise, when the two flag bits are the same, the flag and its corresponding function are not pending.

The first two flag bits of a byte allow the co-processor module to go on and off line by signalling the processor module of its desire to do so. The third bit indicates that the processor module 20 has completed a raw data transfer from the I/O data table in its system RAM 36 to the co-processor. The next four flags indicate that a respective quartet of access FIFO registers require service and the next four flags indicate that a set of respective FIFO management registers require service. The last two bytes 72–73 in the handshake segment are identical to bytes 70 and 71 except they relate to data being sent by the co-processor module 17 to the processor module 20.

In summary, the handshake segment 67 operates as a means for multiplexing many interrupts from either the processor or co-processor through the pair of interrupt lines 60 and 61 (FIG. 3). An interrupt is signalled when the corresponding bits in byte pairs 70–71 and 72–73 are in opposite states. Both modules 17 and 20 can read all the flags to determine if an interrupt has been requested and if a requested interrupt has been serviced.

Referring again to FIG. 4, the next segment 68 in the dual-ported memory 52 stores the FIFO access and management registers and other information to pass message data between the processor and co-processor modules 20 and 17. This segment 68 is referred to herein as the "Channel 0 Segment" and is divided into subsegments as shown in FIG. 6. The first subsegment 74 is a directory for access to other subsegment units. The REQUEST FIFO registers are contained in the next subsegment 75 and are used by the processor 20 to request services from the co-processor 17. The following subsegment 76 contains the CONFIRM FIFO registers that the co-processor uses to confirm services previously requested by the processor. The INDICATE and ACCEPT FIFO registers in subsegments 77 and 78 are used to designate when the co-processor 17 has initiated the transmission of data or a request for data to the processor 20 and when the processor has responded.

The processor free pool and co-processor free pool subsegments 79 and 80 store the message data being exchanged. Specifically, these subsegments include message headers, buffer headers and data buffers for communications through the dual-port interface. Each free pool can be subdivided into multiple subpools, each of which consisting of a pool header 81 and a linked set of message blocks 82, as depicted in FIG. 7.

Each subpool 81 header includes a pointer to the next subpool header, another pointer to the first message block associated with the header and a designation of the size of the data buffer for the subpool. Each message block 82 stores the information as specified in Table II:

TABLE II

| | |
|---|---|
| NEXT - | pointer to the next buffer header associated with this message; |
| DESTINATION - ADDRESS COUNT | number of bytes required by destination address; |
| DESTINATION - ADDRESS | the destination of this message; |
| SOURCE ADDRESS - COUNT | the number of bytes needed to define source address; |
| SOURCE ADDRESS - | address of the message source; |
| TAG - | a user defined field; |
| BUFFER HEADER - POINTER | address of the first buffer header associated with this message; |
| MESSAGE TYPE - | indicates that message is a request or a reply from the processor or the co-processor; |
| PROCESSOR POOL - INDEX | to solicited messages from co-processor parameter, set to identify the subpool from which processor must allocate a buffer for reply; |
| CO-PROC POOL - INDEX | tells co-processor which subpool to use in co-processor free pool subsegment; |
| PRIORITY - | the priority level of this message; |
| BUFFER HEADER - START | reference to start of buffer header in message block; |
| BUFFER - | points to start of data buffer; |
| BUFFER SIZE - | number of bytes in data buffer. |

The raw data transfer segment 69 in FIG. 4 contains information and buffers for the transfer of blocks of unprocessed data between the I/O data tables of the processor module 20 and the co-processor 17.

Referring still to FIGS. 6 and 7, if the processor module 20 creates a message it stores a pointer to the header for that message in a REQUEST FIFO 75 as indicated by arrow 84. The REQUEST FIFO 75 is an array of such pointers preceded by the stored information that is shown in Table III:

TABLE III

| | |
|---|---|
| NEXT IN - | host index to the next available location in the FIFO where a message header pointer can be stored; |
| NEXT OUT - | co-processor index to the next message pointer to be read and processed; |
| WRAP MASK - | the two indexes wrap using this field; and |
| IFLAG NUMBER - | interrupt flag bit number used by this FIFO. |

When the co-processor 17 is interrupted, it reads the next message pointer out of the REQUEST FIFO 75 as indicated by arrow 85, and then reads the indicated pool header 81 and the associated message blocks 82. The co-processor confirms that the message has been received and processed by writing the pointer for the same message header into the CONFIRM FIFO 76 as indicated by arrow 86. The latter FIFO 76 is similar in structure to the REQUEST FIFO 75, and when the processor 20 is interrupted, it reads the next pool header pointer from the CONFIRM FIFO 75 as indicated by arrow 87. The processor 20 then reads the indicated message header from the dual-ported memory 52 to confirm that the message which it initiated has been processed.

Similar data structures exist for messages initiated by the co-processor module 17, as illustrated in FIG. 7. When the co-processor module 17 has data for the processor module 20, the data is stored in the dual ported memory 52 in available message blocks 82 and the header information is placed in an available pool header 81. The co-processor 17 then stores a pointer to the pool header 81 in an INDICATE FIFO 77, as denoted by arrow 90, and interrupts the processor module. The processor module 20 reads the next pointer in the INDICATE FIFO 77, as denoted by arrow 91, and the header and message data are read from the dual ported memory 52. The processor module 20 then writes a pointer to an ACCEPT FIFO 78, as indicated by arrow 92, and it interrupts the co-processor module 17. The co-processor module reads the pointer from the ACCEPT FIFO 78 to confirm that the message has been accepted by the processor as indicated by arrow 93.

Referring again to FIG. 5, the handshake segment includes interrupt flags for each of the four FIFO's 75-78. More specifically, the processor interrupt in the word 70 includes four access flags which correspond to the four FIFO's and the co-processor word 72 includes four access flags which correspond to the four FIFO's. These flags enable the interrupted module to promptly read the appropriate FIFO when it is interrupted by the other module.

The channel 0 segment 68 in the dual-ported memory 52 also stores data structures associated with interface management functions. These include four management FIFO's and associated message headers, buffer headers and buffers (not shown in the drawings) which operate as described above. In addition, there are four management interrupt flags in each of the words 70-73 of the handshake segment 67 (FIG. 5) which enable the processor and co-processor modules to promptly service the management FIFO's.

C. Co-Processor Initialization

Figure 8A:
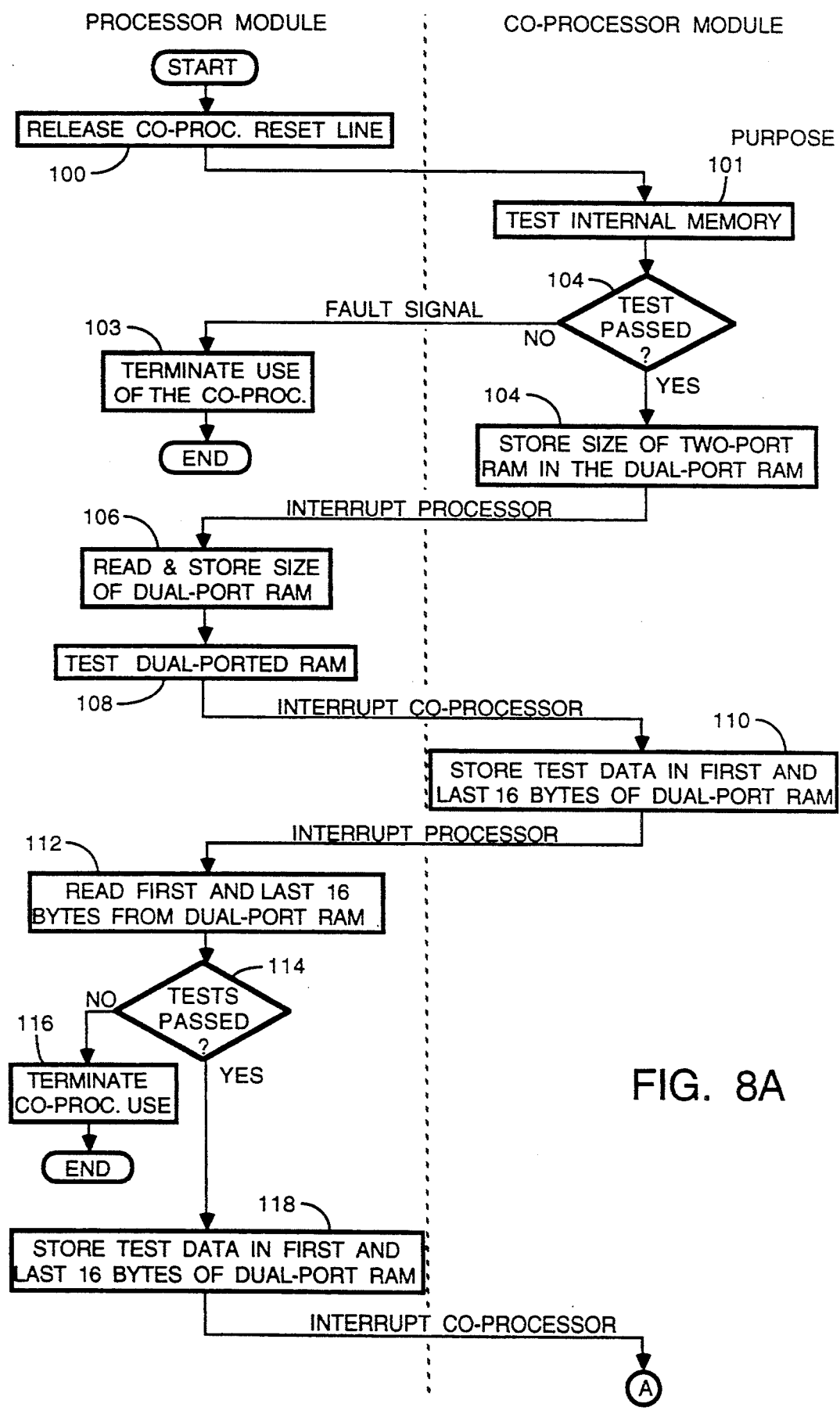
FIGS. 8A and 8B are flowcharts of a process by which the processor module and the co-processor initialize one another.
Figure 8B:
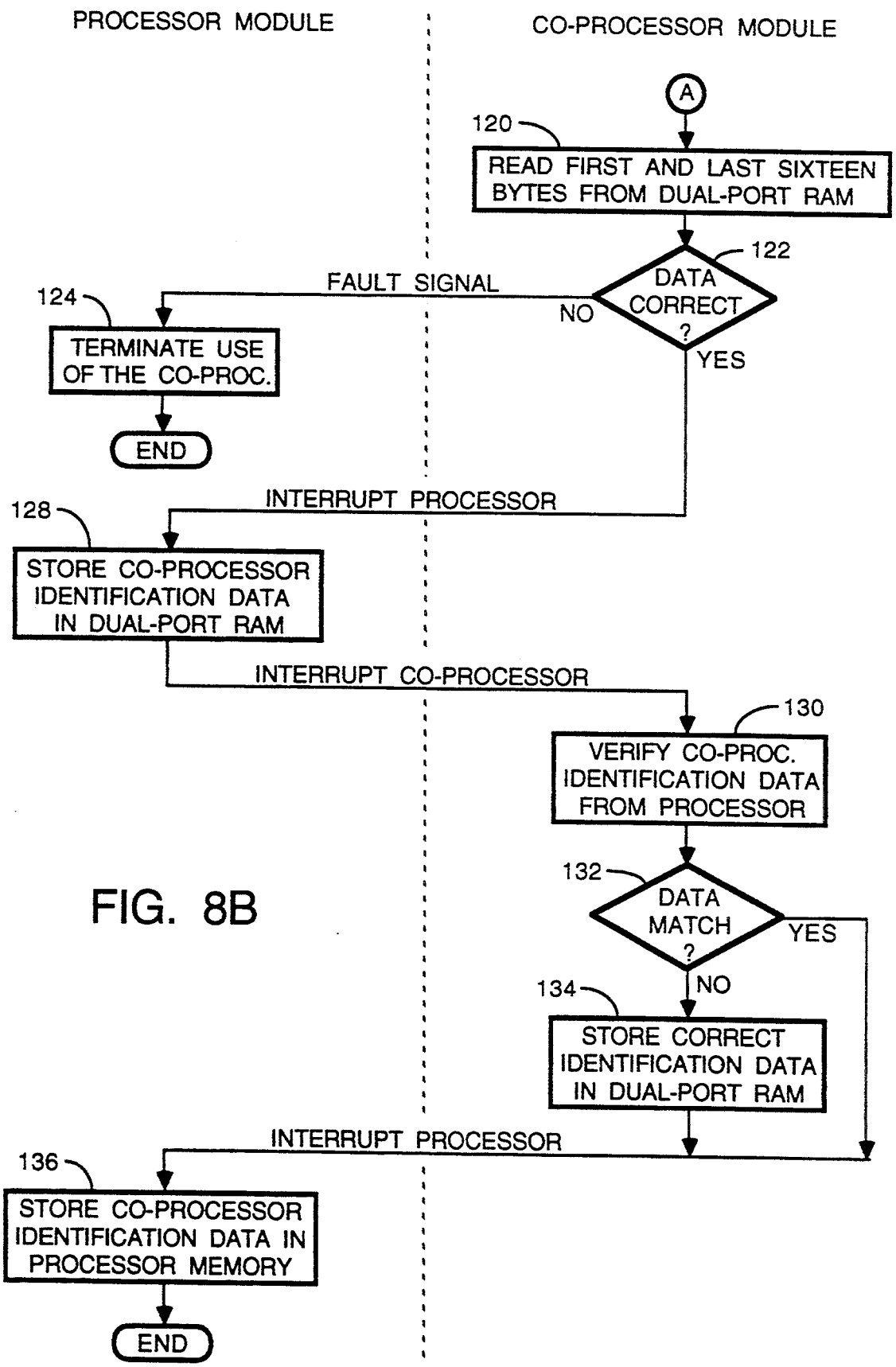

The present invention is particularly directed to the manner in which the co-processor module is reset and involves a cooperative configuration of the co-processor module 17 and the processor module 20, when the system is powered up, an initialization procedure is performed by the two modules 17 and 20 before normal message passing can occur. This process provides a cooperative testing of the dual-port memory 52 and exchange of identification information. The step by step initialization procedure is shown graphically in the flowchart of FIGS. 8A and 8B. These figures are divided into a left portion showing steps performed by the processor module 20 and a right portion for the steps performed by the co-processor module 17.

Upon initial application of power to the programmable controller and following a system wide reset, the processor module 20 checks its components and places them into an initial working state. Following its internal reset process, the processor module 20 commences a cooperative initialization of the co-processor module 17 as depicted by the flowchart in FIG. 8A. This process commences at step 100 where the processor module 20 removes the active reset signal that was being applied to line 59 of its control bus 25. When the microcomputer 56 within the co-processor module 17 senses that the reset signal has been removed, it carries out a test of internal memory 57 at step 101. Then at step 102, the microcomputer 56 determines whether the internal memory 57 has satisfactorily passed the test. If a faulty memory is discovered at this point, the microcomputer 56 pulls the co-processor fault control line 62 indicating to the processor module 20 that an error has been found. The processor module responds to the fault signal at step 103 by setting an error flag in its status registers and which terminating any further use of the co-processor 17. The co-processor initialization routine then terminates. Alternatively, the co-processor upon finding an error can simply terminate the initialization process. Since the next valid step 104 concludes with the co-processor interrupting the processor 20, the processor will know something is wrong if it is not interrupted.

However, if the internal memory 57 of the co-processor module 17 passes the test, the co-processor initialization routine advances to step 104 where the size of the dual ported memory 52 is read from a non-volatile section of its memory 57 by the microcomputer 56 and then placed in a predefined storage location of the dual ported memory. An interrupt request then is applied to line 61 by the co-processor microcomputer 56 to interrupt the first microprocessor 22 in the processor module 20.

The first microprocessor 22 responds to this interrupt by reading the size of the dual ported memory 52 from that device at step 106. The size of the dual ported memory is stored within a block of the first RAM 27 in the communication interface circuit 21 of the processor module 20 as shown in FIG. 2. The processor module 20 then performs a conventional test of the dual ported memory 52 by storing and reading back test data at step 108. A flag contained within the first RAM 27 of the processor module 20 is set to indicate the passage or failure of this test of the dual ported memory 52. If the memory passes the test, the processor module, and specifically the first microprocessor 22, applies an interrupt request (IRQ) signal over line 60 of control bus 25 to the co-processor module 17. This interrupt request activates the microcomputer 56 within the processor module 17 which responds by storing predefined test data in the first and last sixteen bytes of the dual ported memory 52, at step 110. Once the test data has been stored, the microcomputer 56 issues an interrupt request (IRQ) over line 61 to the first microprocessor 22 in processor module 20.

The first microprocessor 22 responds to this interrupt request at step 112 by reading the first and last sixteen bytes from the dual ported memory 52. The first microprocessor 22 then determines whether a proper set of test data have been read from the dual ported memory 52 at step 114. If the dual ported memory failed any one of these memory tests, the initialization process branches to step 116 where the first microprocessor 22 sets a flag within the first RAM 27 to discontinue any further use of the co-processor module 17. If required, an error indication also is transmitted over serial communication link 13 to the operator terminal 11 at step 116 before the co-processor initialization routine terminates. When a bad co-processor module 17 is found, the processor module 20 continues other control functions that do not use the co-processor module.

Assuming that the dual ported memory 52 has passed all of the tests thus far, the program execution advances from step 114 to step 118 where a different set of predefined test data are stored by the first microprocessor 22 into the first and last sixteen bytes of the dual ported memory 52. Then the first microprocessor 22 interrupts the co-processor 17 by applying an active signal to the co-processor interrupt request (IRQ) line 60. The initialization routine then advances to step 120 on FIG. 8B where the co-processor microcomputer 56 responds to the interrupt request by reading the first and last sixteen bytes from the dual ported memory 52. The microcomputer 56 examines these bytes at step 122 to determine whether the proper set of test data has been read from memory. If an error is found in that data, a fault signal is sent by the microcomputer 56 via line 62 to the processor module at step 124. The first microprocessor 22 responds to this fault signal by setting the status flag within the first RAM 27 to indicates that further use of the co-processor module 17 should not occur. As previously indicated, an error message also may be sent to the operator terminal 11 before the initialization process terminates.

However, if the proper set of test data has been read from the dual ported memory, the co-processor microcomputer 56 sends an interrupt request (IRQ) via line 61 to the processor module 20 at step 126. This interrupt request indicates to the processor module 20 that the co-processor 17 has found the dual memory RAM 52 to be operating satisfactorily.

The first microprocessor 22 in the processor module responds at step 128 to the interrupt request by storing co-processor identification data contained within its system RAM 36 into a designated location within the negotiation segment of the dual ported memory 52. If the processor module 20 had operated previously with this co-processor module 17, the proper identification data will have been stored in the system RAM 36. Otherwise this data will be either all zeroes the first time the system is powered or incorrect if a different module was used previously. Once the identification has been stored, the first microprocessor 22 again interrupts the co-processor module 17. The co-processor microcomputer 56 responds to this latter interrupt request at step 130 by comparing the co-processor identification data stored by the processor module 20 in the dual ported memory 52 with data contained within a non-volatile section of the co-processor memory 57. A determination is made at step 132 whether the two sets of co-processor identification data match. If a match does not exist, the microcomputer 56 transfers the identification data from the co-processor memory 57 into the designated location of the dual ported memory 52 at step 134. The microcomputer 56 then sends an interrupt request to the processor module.

The interrupt request causes the processor module 20 to read the new co-processor identification data message from the dual ported memory 52 and store the data in the system RAM 36 at step 135. The co-processor initialization procedure then terminates satisfactorily and the processor module begins executing its main operating software program.

Figure 9:
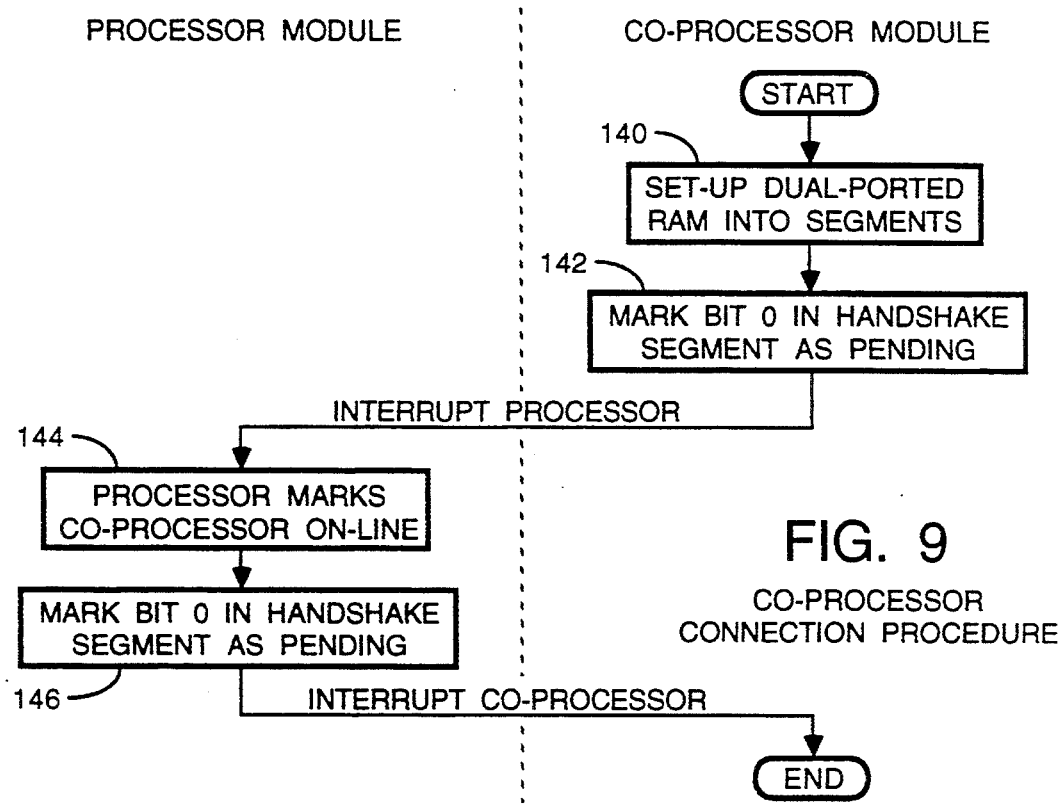
FIG. 9 illustrates the process by which a co-processor module comes on-line.

When the initialization procedure is completed, the co-processor module 17 still is in an off-line state. Therefore, normal message exchange cannot occur between the modules 17 and 20 until the co-processor module initiates a connection procedure depicted in FIG. 9. This process commences at step 140 with the microcomputer 56 in the co-processor module 17 configuring the dual ported memory 52 into the segments and subsegments previously described The microcomputer 56 then alters bit 1 in byte 72 of the handshake segment shown in FIG. 5. The microcomputer 56 then sends an interrupt request to the first microprocessor 22 in the processor module 20.

The first microprocessor 22 responds to the interrupt request by altering bit 1 in the acknowledge byte 73 to coincide with the state of bit 1 in byte 72. Then the first microprocessor performs various housekeeping tasks to mark the co-processor module 17 as being on-line at step 144. The dual ported memory 52 in the co-processor module 17 is accessed by the first microprocessor 22 in the processor module 20 to mark bit 1 as pending in handshake segment byte 70. The co-processor module 17 is then interrupted and the connection of the two modules is complete with the co-processor module being considered on-line.

Figure 10:
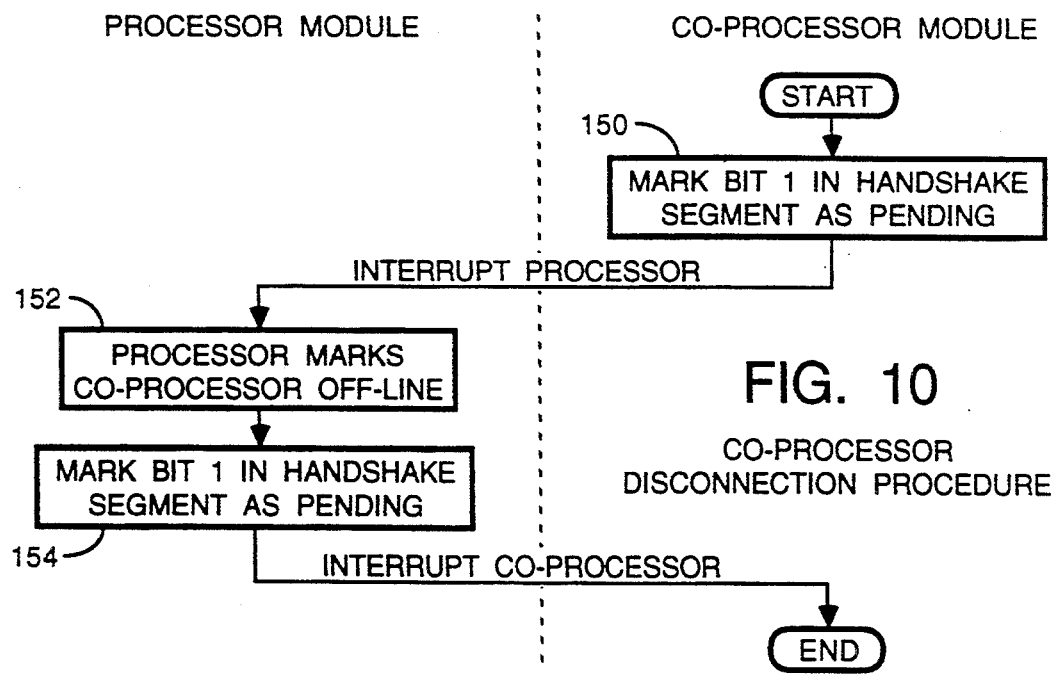
FIG. 10 illustrates the process by which a co-processor module goes off-line.

At other times during the course of the programmable controller's operation, the co-processor module 17 can take itself off-line by carrying out a disconnection procedure depicted in FIG. 10. This procedure commences at step 150 at which the co-processor marks bit 0 as pending in byte 72 of the handshake segment 67 in the dual ported memory 52. The microcomputer 56 then sends an interrupt request to the processor module. The first microprocessor 22 in the processor module 20 responds to the interrupt request by altering bit 0 in the acknowledge byte 73 to coincide with the state of bit 0 in byte 72. Then at step 152 housekeeping tasks are performed by microprocessor 22 to mark the co-processor module 17 as being off-line. Thereafter, bit 0 is marked as pending in byte 70 of the handshake segment 67 of the dual ported memory 52 by the first microprocessor 22 at step 154. An interrupt request is then sent to the co-processor module 17 to indicate that it is now off-line. The co-processor module can return on line by performing the procedure in FIG. 9 described previously.

The invention being claimed is:

1. A programmable controller having a processor module and a functional module in which one of said modules includes a memory that is accessible by both said modules and through which information is exchanged by one module storing said information in said memory and said other module reading said information from said memory, said programmable controller further comprising a mechanism for initializing said exchange of information comprising:

said module with said memory having a means for writing into said memory size data designating a number of storage locations;

said module without said memory having means for reading said size data from said memory;

said processor module having means for writing a first predefined set of data in a set of storage locations of said memory and sending a first signal to said functional module;

said functional module having a first means for responding to said first signal by reading data from said set of storage locations of said memory and testing said data to determine whether said data match said first predefined set of data;

said functional module having means for writing a second predefined set of data in a group of storage locations of said memory and sending a second signal to said processor module;

said processor module having a second means for responding to said second signal by reading data from said group of storage locations of said memory and testing said data to determine whether said data match said second predefined set of data;

said processor module having means for writing into a prescribed storage location of said memory either an identification of a functional module type, or default information if said processor module does not possess an identification of a functional module type and sending a third signal to said functional module;

said functional module having a third means for responding to said third signal by reading data from said prescribed storage location of said memory and testing said data to determine whether said data correctly identifies said functional module;

said functional module having means for writing data designating a correct module type into said prescribed storage location of said memory and sending a fourth signal to said functional module, when said third means for responding indicates that said data read in response to said third signal does not properly identify said functional module; and said processor module having a fourth means for responding to said fourth signal by reading data from said prescribed storage location of said memory.

2. The programmable controller as recited in claim 1 wherein said processor module further comprises means for storing test data into said memory, then reading data from said memory, and determining whether said data read from said memory match said test data.

3. The programmable controller as recited in claim 1 wherein said processor module further comprises means indicating an inability to exchange data with said functional module when either said first or second means for responding determines that said data does not match.

4. A method of initializing a data interface between a processor module and a functional module of a programmable controller in which data is exchanged by one module writing said data in a commonly accessible memory in one of said modules that then is read by said other module, said steps of said method comprising:

said functional module writing size data designating a number of storage locations in said memory;

said processor module reading said size data from said memory;

said processor module writing a first predefined set of data in a set of storage locations of said memory;

said functional module reading data from said set of storage locations of said memory and testing said data to determine whether said data match said first predefined set of data;

said functional module writing a second predefined set of data in a group of storage locations of said memory;

said processor module reading data from said group of storage locations of said memory and testing said data to determine whether said data match said second predefined set of data;

said processor module writing into a prescribed storage location of said memory either an identification of a functional module type, or default information if said processor module does not possess an identification of a functional module type;

said functional module reading data from said prescribed storage location of said memory and testing said data to determine whether said data correctly identifies said functional module;

when said data does not properly identify said functional module, said functional module stores data designating its actual type into said prescribed storage location of said memory; and said processor module reading data from said prescribed storage location of said memory.

5. The method as recited in claim 4 further comprising said processor module performing said steps of writing data into said memory, then reading said data from said memory, and determining whether said data read from said memory match said data that was stored in said memory.

6. The method as recited in claim 4 wherein said memory has a section of storage locations which store a designation as to whether said functional module is available to exchange data with said processor module, and said functional module becomes available by:

said functional module placing a bit in said section of storage locations into a predefined logic level to indicate said availability to said processor module; and said processor module replies by placing another bit in said section of storage locations into a predetermined logic level to acknowledge that said functional module is available.

7. The method as recited in claim 6 wherein said functional module becomes unavailable to exchange data with said processor module by:

said functional module placing a given bit in said section of storage locations into a logic level which indicates said unavailability to said processor module; and said processor module reads said given bit, and replies by placing another bit in said section of storage locations into a logic level which acknowledges that said functional module is unavailable.

8. The method as recited in claim 7 further comprising said step of said processor module indicating an inability to exchange information with said functional module when data is found not to match either said first or second predefined sets of data.

* * * * *

UNITED STATES PATENT AND TRADEMARK OFFICE
CERTIFICATE OF CORRECTION

PATENT NO. : 5,416,908
DATED : May 16, 1995
INVENTOR(S) : David A. DiCarlo et al.

It is certified that error appears in the above-indentified patent and that said Letters Patent is hereby corrected as shown below:

Column 4, line 11, "miming signals" should be ---timing signals---.

Columns 5,6, lines 68, 1, "commuter language" should be ---computer language---.

Signed and Sealed this

Eighth Day of August, 1995

Attest:

BRUCE LEHMAN

*Attesting Officer*     *Commissioner of Patents and Trademarks*